W. W. KRUTSCH.
VEHICLE WHEEL.
APPLICATION FILED MAR. 3, 1915.
1,162,079. Patented Nov. 30, 1915.
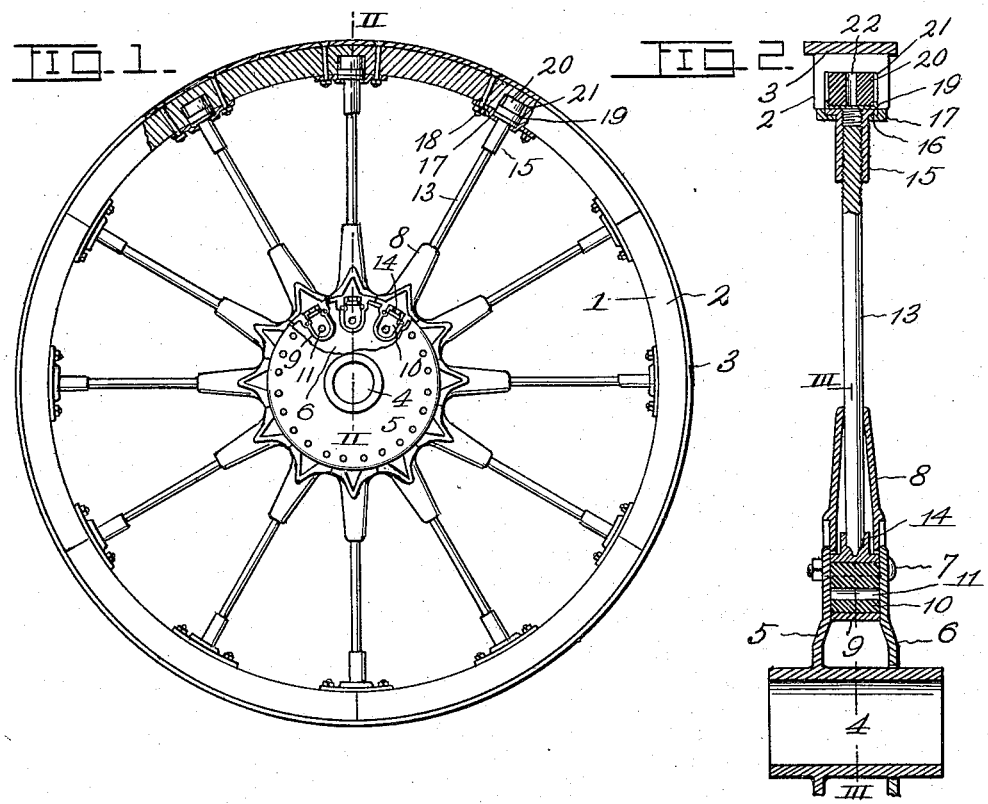
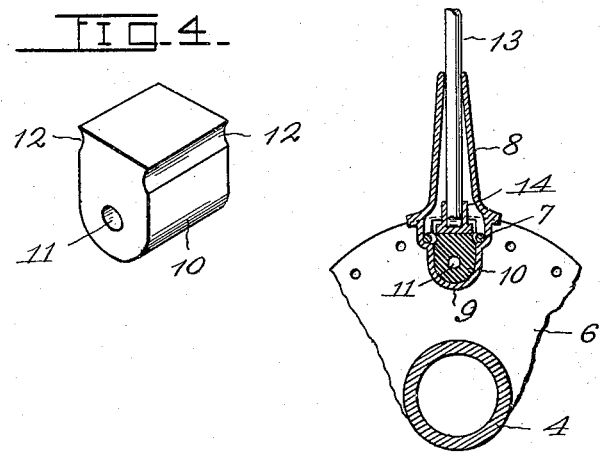
WITNESSES:
R. E. Hamilton
Fred C. Fischer
INVENTOR:
Willis W. Krutsch,
BY F. G. Fischer,
ATTORNEY.

UNITED STATES PATENT OFFICE.

WILLIS W. KRUTSCH, OF COFFEYVILLE, KANSAS, ASSIGNOR OF ONE-HALF TO CHARLIE ALLEN WALKER, OF COFFEYVILLE, KANSAS.

VEHICLE-WHEEL.

1,162,079.

Specification of Letters Patent.  Patented Nov. 30, 1915.

Application filed March 3, 1915. Serial No. 11,917.

*To all whom it may concern:*

Be it known that I, WILLIS W. KRUTSCH, a citizen of the United States, residing at Coffeyville, in the county of Montgomery and State of Kansas, have invented certain new and useful Improvements in Vehicle-Wheels, of which the following is a specification.

My invention relates to improvements in vehicle wheels, and the present invention relates more particularly to cushions whereby the wheels are rendered more or less resilient, so that they may pass over obstructions in a roadway without imparting undue shock to the vehicle.

In the accompanying drawings, which illustrate the invention, Figure 1 is a broken side elevation, partly in section, of a vehicle wheel embodying the invention. Fig. 2 is a vertical section, enlarged, on line II—II of Fig. 1. Fig. 3 is a broken vertical section on line III—III of Fig. 2. Fig. 4 is a detail perspective of a hub cushion. Fig. 5 is a detail perspective of a rim cushion.

1 designates the rim, 2 the fellies and 3 the tire of the wheel.

4 designates the hub of the wheel which has an integral peripheral flange 5 and a removable peripheral flange 6, said flanges being spaced apart but connected by transverse bolts 7.

8 designates a plurality of spoke members rigidly secured between the hub flanges 5 and 6 by the bolts 7, which extend through said spoke members. The spoke members 8 have sockets 9 for the reception of resilient cushions 10, made of rubber or other suitable material. The cushions 10 have holes 11 extending therethrough to increase their resiliency. They also have two oppositely-disposed marginal grooves 12 to clear the bolts 7, as disclosed by Fig. 1, so that said bolts will not bear against the cushions and thus interfere with their compression when subjected to a load.

13 designates spoke members which fit into the spoke members 8 and also in saddles 14, resting upon the cushions 10. This arrangement of the spoke members 8 and 13 renders the spokes adjustable, so that they are free to contract and lengthen, as required. The rim ends of the spoke members 13 fit into sleeves 15, the marginal ends 16, of which are retained in place by clips 17, secured to the fellies 2 by bolts 18.

The marginal flanges 16 of the sleeves 15, bear against caps 19, upon which resilient cushions 20 are fitted. The cushions 20 are arranged in recesses 21 in the fellies 2, and have central holes 22 extending therethrough to permit them to compress more readily when subjected to a load. The recesses 21 are wider than the cushions 20 to permit the latter to bulge laterally when compressed.

When the wheel passes over an obstruction in a roadway the lower spokes contract and compress their respective cushions 10 and 20, owing to the load upon the hub 4 which prevents the latter from moving vertically as high as does the rim of the wheel, consequently undue shock will not be imparted to the vehicle.

From the foregoing description, it is apparent that I have produced a wheel possessing more or less resiliency, one that is strong and durable, and one that can be readily replaced at small cost.

Having thus described my invention, what I claim and desire to secure by Letters Patent, is:

In combination, a vehicle wheel rim having recesses therein, resilient cushions located in said recesses and having holes therein to increase their resiliency, a hub, self-adjusting spokes connecting the rim and said hub and provided with sockets at their hub ends, and resilient cushions located in said sockets and provided with holes to increase their resiliency, substantially as described.

In testimony whereof I affix my signature, in the presence of two witnesses.

WILLIS W. KRUTSCH.

Witnesses:
F. G. FISCHER,
L. J. FISCHER.

Copies of this patent may be obtained for five cents each, by addressing the "Commissioner of Patents, Washington, D. C."